United States Patent [19]

Clark et al.

[11] Patent Number: 5,235,440
[45] Date of Patent: Aug. 10, 1993

[54] OPTICAL INTERCONNECTOR AND HIGHLY INTERCONNECTED, LEARNING NEURAL NETWORK INCORPORATING OPTICAL INTERCONNECTOR THEREIN

[75] Inventors: Rodney L. Clark; Charles F. Hester, both of Huntsville, Ala.

[73] Assignee: Teledyne Industries, Inc., Los Angeles, Calif.

[21] Appl. No.: 735,272

[22] Filed: Jul. 24, 1991

Related U.S. Application Data

[62] Division of Ser. No. 431,899, Nov. 6, 1989, Pat. No. 5,068,801.

[51] Int. Cl.$^5$ .......................... G03H 1/12; G03H 1/02
[52] U.S. Cl. ........................................ 359/11; 359/11; 364/822
[58] Field of Search .................. 359/7, 10, 11, 21, 265, 359/275; 364/822

[56] References Cited

U.S. PATENT DOCUMENTS

| | | | |
|---|---|---|---|
| 3,553,460 | 1/1971 | Preston, Jr. et al. | 250/217 |
| 4,187,000 | 2/1980 | Constant | 350/162 SF |
| 4,278,318 | 7/1981 | Nakayama et al. | 350/378 |
| 4,569,033 | 2/1986 | Collins et al. | 364/845 |
| 4,603,398 | 7/1986 | Bocker et al. | 364/845 |
| 4,607,344 | 8/1986 | Athale et al. | 364/841 |
| 4,620,293 | 10/1986 | Schlunt et al. | 364/845 |
| 4,696,533 | 9/1987 | Kingston et al. | 350/96.14 |
| 4,750,153 | 6/1988 | Owechko | 365/125 |
| 4,815,027 | 3/1989 | Tokumitsu et al. | 364/841 |
| 4,849,940 | 7/1989 | Marks et al. | 365/215 |
| 4,860,253 | 8/1989 | Owechko et al. | 365/125 |
| 4,862,406 | 8/1989 | Fisher | 364/807 |
| 4,952,010 | 8/1990 | Healey et al. | 359/10 |
| 5,004,309 | 4/1991 | Caulfield et al. | 350/3.68 |
| 5,008,833 | 4/1991 | Agranat et al. | 364/807 |
| 5,033,020 | 7/1991 | Engel | 364/822 |
| 5,056,039 | 10/1991 | Caulfield | 364/822 |
| 5,132,813 | 7/1992 | Caulfield et al. | 359/11 |

OTHER PUBLICATIONS

Casasent, "Spatial Light Modulators", *Proceedings of the IEEE*, vol. 65, No. 1, Jan. 1977, pp. 143-157.
Waibel, "Building Blocks For Speech", *Byte*, Aug. 1989, pp. 235-242.
Abu-Mostafa et al., "Optical Neural Computers", *Scientific American*, Mar. 1987, pp. 88-95.
Psaltis et al, "Optical Neural Nets Implemented Volume Holograms", *Optical Society of America Topical Meeting on Optical Computing* vol. 11 1987 pp. 129-132.
Caulfield, H. J.; Applied Optics, vol. 26, #19, Oct. 1, 1987, pp. 4039-4040.

*Primary Examiner*—Nelson Moskowitz
*Attorney, Agent, or Firm*—Beveridge, DeGrandi, Weilacher

[57] ABSTRACT

A variable weight optical interconnector is disclosed to include a projecting device and an interconnection weighting device remote from the projecting device. The projecting device projects a distribution of interconnecting light beams when illuminated by a spatially-modulated light pattern. The weighting device includes a photosensitive screen provided in optical alignment with the projecting device to independently control the intensity of each projected interconnecting beam to thereby assign an interconnection weight to each such beam. Further in accordance with the present invention, a highly-interconnected optical neural network having learning capability is disclosed as including a spatial light modulator, a detecting device, an interconnector according to the present invention, and a device responsive to detection signals generated by the detecting device to modify the interconnection weights assigned by the photosensitive screen of the interconnector.

20 Claims, 4 Drawing Sheets

OPTICAL INTERCONNECTOR AND HIGHLY INTERCONNECTED, LEARNING NEURAL NETWORK INCORPORATING OPTICAL INTERCONNECTOR THEREIN

This application is division of U.S. application Ser. No. 07/431,899 filed on Nov. 6, 1989 and now issued as U.S. Pat. No. 5,068,801.

BACKGROUND OF THE INVENTION

The present invention pertains to an optical interconnector and an optical learning system or network incorporating the interconnector therein. More particularly, the present invention pertains to an optical interconnector including an interconnection beam projection means which projects a distribution of light beams to interconnect a detecting means with an input means, and a weighting means, located in an optical path between the projection means and either the input or the detecting means, which controls a parameter of each of the interconnecting beams to set the interconnection strength or weight thereof. The optical learning system according to the invention incorporates the interconnector to provide a highly interconnected neural network having learning capability.

The present invention relates to an optical interconnector and an optical learning system incorporating such an interconnector to provide what has become known in the art as a "learning neural network". By way of background, generally a neural network comprises devices that simulate the responses of biological neurons. A simplistic model for a neuron $N_0$ is shown in FIG. 1 to receive three inputs $X_1$, $X_2$, and $X_3$ at a device which sums the inputs according to the simple equation $S = X_1 + X_2 + X_3$. Positive X's may be defined as excitatory and tend to make the model neuron "fire", that is provide a nonzero output. Negative X's, defined as inhibitory, tend to prevent the model neuron from firing. A nonlinear operator changes an output signal from the output S of the summing device into a new signal according to a nonlinear, threshold response curve. A low input signal to the nonlinear operator, that is a signal below some threshold, $S_0$, results in a zero output at the nonlinear operator. A high input signal gives a fixed maximum output. An intermediate input results in an intermediate output.

Output S' from the nonlinear operator is applied to still other neurons after multiplication by a weighting factor W by a distributor. All signals $W_1S'$, $W_2S'$, and $W_3S'$ are proportional to S'. The weighting factor W controls the strength or weight of the connections between neuron $N_0$ and the summing elements of the three other neurons $N_1$, $N_2$, and $N_3$ shown in FIG. 1. If, for example, the weighting factor $W_1$ is small, the interconnection between neurons $N_0$ and $N_1$ is said to be weak and thus the signal $S_1$ from neuron $N_0$ to neuron $N_1$ is attenuated. Conversely, if the weighting factor is large the signal $S_1$ is amplified and the interconnection between the neurons is said to be strong. It is seen that the information, memory, and problem solving methods characteristic of a neural network are determined by the interconnections in network, that is what is interconnected to what and with what strength.

Turning to the prior art, one recognizes U.S. Pat. No. 4,660,166 to Hopfield as disclosing an earlier network which electronically simulates neural activity to provide a system capable of retrieving particular information from a system memory in response to an interrogation thereof. The patentee describes such a retrieval system as an associative memory, that is a memory that provides an output which is particularly associated with a particular input applied to the system. In the Hopfield device an interconnected network of electronic amplifiers provides the "neurons".

To provide a neural network with capability to learn, the interconnection strengths between the "neurons" in the network must be modifiable. The neurons must be modifiable to provide a desired output when the network is presented with an input. To provide modifiable neurons in an electrical network greatly complicates the overall electronics. Moreover, electronic implementations appear to be inherently limited in the number of interconnections that can be made without regard to how difficult it is to change the strengths of the interconnections. It is believed unlikely that an electronic circuit providing for more that about 1,000,000 i.e. $1 \times 10^6$ interconnections is feasible as cross-talk problems and problems with power requirements become overwhelming. In view of the shortcomings of electronic implementations, optical learning networks have been developed. Such a network is described in an article by K. Wagner and S. Psaltis which discloses a learning network utilizing a volume hologram comprising photorefractive crystals to interconnect nonlinear optical devices known in the art as Fabry-Perot etalons. The interconnections are both made and weighted by the interference patterns in the photorefractive crystal. Learning commences with the presentation of an optical input to the network. The network initially will display an output which greatly differs from the desired output. To correct the variance between the actual and desired outputs, i.e. to induce the network to "learn", error signals are determined by taking the difference between the actual and desired outputs. The error signals are sent backwards through the photorefractive material as light rays to modify the interference patterns and thus the weight of the interconnections made by the hologram. Such modification is executed continuously until the generated output matches or very nearly matches the desired output whereafter the error signals are no longer permitted to propagate through the network.

The interconnection capacity of photorefractive material holograms also is inherently limited. The density of the interference patterns in the photorefractive material increases in proportion to the number of interconnections made by the hologram. As this density is increased, it becomes increasingly difficult to modify the weight of some interconnections without undesirably changing the strengths of other interconnections. These cross-talk problems in the interconnection capacity of photorefractive interconnecting holograms thereby inherently limit the number of modifiable interconnections which can be made in a neural learning network which incorporates such.

SUMMARY OF THE INVENTION

The optical interconnector according to the present invention overcomes limitations inherent in prior art systems by providing a first element dedicated to making optical interconnections and a separate, second element dedicated to assigning weights to the interconnections made by the first element. The second element can be controlled to change the assigned interconnection weights or strengths during operation of the interconnector to provide learning capacity in an optical neural network incorporating such an interconnector. The active area of either the first or the second elements of the interconnector in accordance with the present invention is not limited by crystal size or uniformity. Accordingly, the interconnector overcomes unavoidable limitations in interconnection capacity in for example photorefractive crystal, volume hologram interconnectors.

The "first element" in the optical interconnector in accordance with the present invention comprises a projection means that projects a distribution of interconnecting light beams. In the preferred embodiments, the projecting means is provided by a holographic means comprising an array of spatially-localized holograms. The "second element", located remotely of the projecting means, amplitude modulates each interconnection beam to encode the strength of each interconnection made by the beams. In the preferred embodiments, this "second element" comprises a photosensitive screen. The photosensitive screen controls the intensity of each interconnecting beam and may be completely transparent, partially transparent or substantially opaque to any particular interconnecting beam. In the preferred embodiments, the screen could comprise a photochromic, or a photodichromic material, a photodichroic material, or a material having both photodichroic and photochromic properties.

In a preferred embodiment of the interconnector where the photosensitive screen comprises a photochromic material, the screen will change its absorption spectrum in response to exposure by light of a certain threshold intensity. The screen is imaginarily divided into partitions or cells in one-to-one correspondence with the holograms of the holographic means. Each cell or partition can be exposed to light having the requisite threshold intensity to locally change its absorption spectrum to make such partition opaque, without affecting the optical transmittivity of adjacent partitions. The screen partitions become progressively less transmissive with continued exposure to light of the threshold intensity. On the other hand, light having the same wavelength, but an intensity below the threshold can pass through the screen without appreciably affecting the transmittivity of the screen.

In an alternative embodiment of the interconnector, the photosensitive screen is formed of a photodichroic material. Modification of the photodichroic screen can be carried out by several known techniques including direct writing or suppressive writing, and direct or suppressive extinction writing.

In use, the interconnector in accordance with the present invention is positioned to optically interconnect an input device, such as a spatial light modulator and an output device such as a photodetector. The photosensitive screen can be positioned in the optical path between the holographic means and the input device or between the holographic means and the output device. When illuminated by an input spatial pattern from an input spatial modulator, the holographic means projects interconnection beams onto the output photodetector to fully interconnect the input and output devices. The projected interconnecting beams are modulated according to the input spatial pattern. The holographic means only switches the direction of the modulated light from the input device and does not change the relative intensity of the switched light. The photosensitive screen however does amplitude modulate the interconnecting beams to change their relative intensities and thereby encode their interconnection strengths.

The disclosed optical, learning neural network which includes an interconnection apparatus according to the present invention has an interconnection capacity attaining $10^{12}$ interconnections. The preferred learning network utilizes a page-oriented holographic means comprising an $N^2 \times N^2$ array of spatially localized holograms arranged on a single holographic plate or substrate. Each hologram projects one interconnecting beam so that the entire array provides for up to $N^4$ interconnections. The number N is contemplated to be very large and to equal or exceed $10^3$.

In the preferred network according to the present invention, a transmissive spatial light modulator (TSLM), defined to have $N^2$ pixels, modulates laser light in a particular way at each pixel thereof to provide a modulated input or spatial pattern of $N^2$ light beams to illuminate the holographic means. The beam modulated by each pixel of the TSLM illuminates $N^2$ holograms of the holographic means. Each such set of $N^2$ uniformly illuminated holograms divides the illuminating beam into $N^2$ interconnecting beams and projects one interconnecting beam to each of the corresponding $N^2$ pixels defined on the photodetector output device to fully interconnect the input and output devices. The photosensitive screen is disposed in the optical path between either the input TSLM and the holographic means or the holographic means and the photodetector output to set the strengths of the interconnections between the input and output devices.

A modifying device controls the transmittivity of the screen. In the preferred embodiments, the modifying device comprises a computer and an optical modifying means. The computer receives detection signals from the photodetector and generates an error signal based upon the detection signals, the input data injected into the network by the TSLM, and signals representative of a desired output pattern. The error signals are applied to the optical modifying means which amplifies the constituent interconnecting beams in the output light pattern which are responsible for generating the error signals. The amplified light is directed back through the network onto the screen, to expose the screen and thereby change the absorption spectrum of selected cells. The network automatically, selectively reduces the transmittivity of those cells responsible for transmitting erroneous interconnecting beams in order to modify the interconnection strengths and thereby reduce the error signals as the generated output pattern more nearly resembles the desired output for a given input.

A variable weight optical interconnector in accordance with the present invention comprises a projecting means and an interconnection weighting means remote from the projecting means. The projecting means projects a distribution of interconnecting light beams when illuminated by a spatial light pattern. The interconnection weighting means includes a photosensitive screen provided in optical alignment with the projection means. The screen has variable transmittivity to control a parameter of each of the interconnecting light beams and thereby assign an interconnection weight to each such beam.

A highly interconnected optical neural network having capability to learn in accordance with the present invention comprises a spatial modulating means responsive to an input signal for modulating light to provide modulated optical signals, detecting means for providing detection signals in response to light incident thereon, interconnector means for providing a distribution of interconnecting light beams to the detecting means when illuminated by the modulated optical signals to interconnect the modulating means and the detecting means, and means responsive to the detection signals for modifying the interconnection weights assigned by the weighting means. The interconnector means includes projection means which projects interconnecting beams without changing a parameter of the beams relative to each other, and an interconnection weighting means provided in an optical path of the projection means for controlling a parameter of each interconnecting light beam relative to the other beams so as to assign an interconnection weight to each beam and thereby provide weighted, modulated interconnecting beams.

BRIEF DESCRIPTION OF THE DRAWINGS

Further aspects and features of the present invention will be even more apparent from the following detailed description and drawings, and the appended claims. In the drawings:

DETAILED DESCRIPTION OF THE INVENTION

Figure 1:
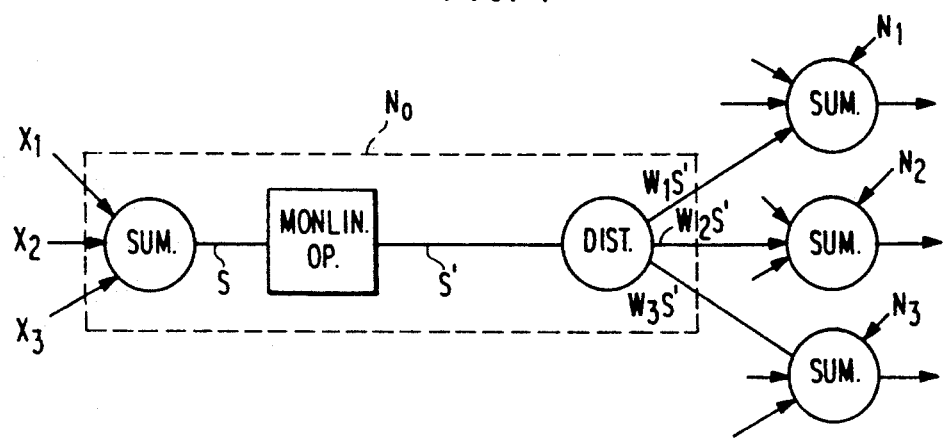
FIG. 1 is a schematic view illustrating a model for an interconnected neuron.
Figure 2:
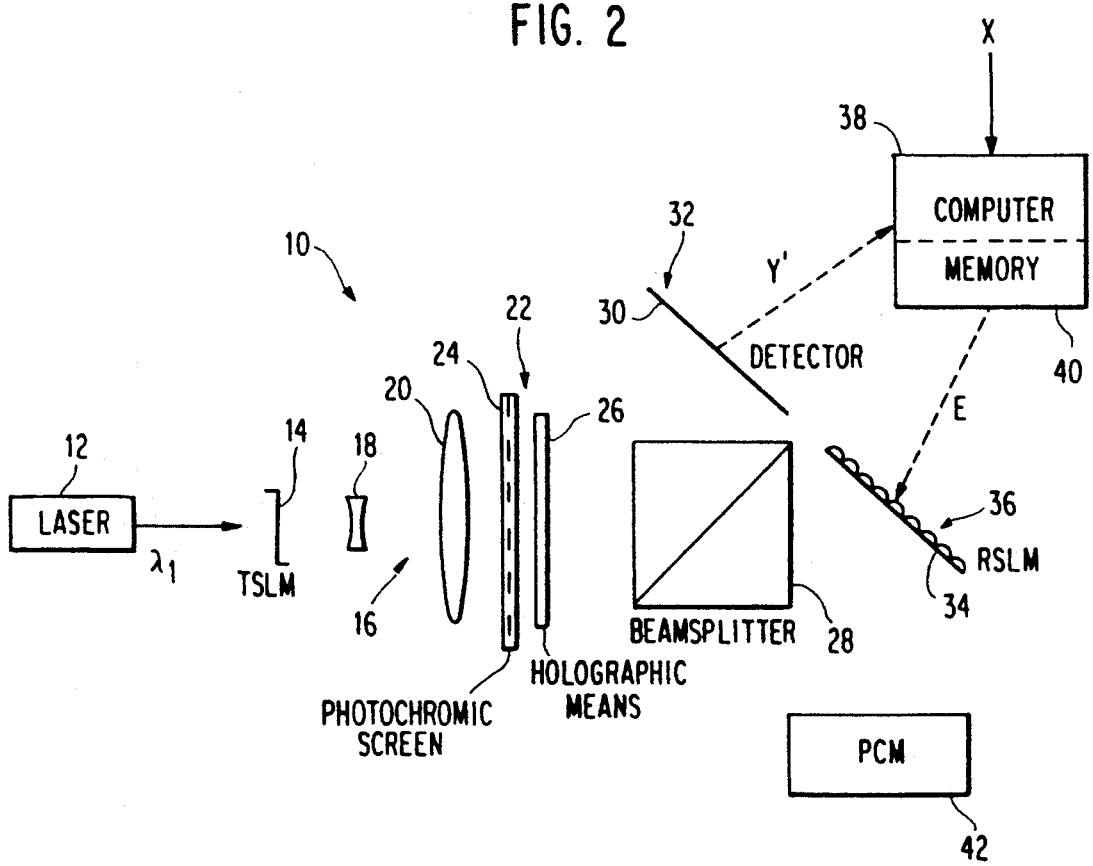
FIG. 2 is a block diagram of a preferred embodiment of the neural network which incorporates the interconnector according to the present invention.

In schematic form, FIG. 2 shows a preferred, highly interconnected neural network 10 having learning capability in accordance with the present invention. It is contemplated that preferred network or system 10 can be implemented completely with optical elements. However, as will be seen, network 10 could comprise various combinations of optical and electrical elements while remaining well within the scope of the present invention.

Network 10 is seen to include a laser 12 providing a source of laser light at a particular wave-length. Laser light from laser source 12 is directed onto a spatial light modulator (TSLM) 14. Spatial light modulator 14 is of the polarizing transmissive type, and so when laser light from source 12 is transmitted through TSLM 14, it is modulated to provide a spatial pattern according to input data programmed into the TSLM. Modulated light transmitted through TSLM 14 is expanded by a lens system 16 comprising a double concave lens 18 and a focusing lens 20. Lens system 16 directs the expanded, modulated beams from TSLM 14 through an optical interconnector 22 in accordance with the present invention. Preferred interconnector 22 comprises a photosensitive, transmissive screen 24 and a page-oriented holographic means 26. Holographic means 26 is formed to project $N^4$ light beams to beamsplitter 28 when the holographic means is illuminated. It will be seen that the intensity of each beam projected by holographic means 26 depends upon the particular spatial distribution of modulated light transmitted by TSLM 14, which modulated light illuminates the holographic means, and the transmissive condition of photosensitive screen 24. Beamsplitter 28 splits the beams projected by holographic means 26 and directs the split beams onto designated pixels at the photodetecting surface 30 of a detector 32 and onto associated pixels defined on the reflective side 34 of a reflective spatial light modulator (RSLM) 36. Detection signals from the detector 32 are applied to computer 38. Computer 38 also receives signals indicative of a desired output spatial pattern from a desired pattern memory 40 and signals representative of the input signal pattern which are applied simultaneously to TSLM 14. Based upon a comparison of the detection signals and the desired output pattern signals, for a given input signal pattern, computer 38 generates error signals and applies the error signals to RSLM 36. A phase conjugate mirror (PCM) 42 is disposed to receive light reflected from the reflective face 34 of RSLM 36. The PCM 42 amplifies and reverse propagates the received light back to RSLM 36 which then reflects the amplified light to expose transmissive screen 24.

Interconnector 22 provides for complete interconnection between each pixel defined on TSLM 14 and each pixel defined on the photodetection surface 30 of detector 32. Interconnector 22 is depicted in plan view in FIG. 3 as comprising phototransmissive screen 24 in optical alignment with holographic means 26. Holographic means 26 is the element which makes the interconnections in network 10 and therefore will be discussed first. In the preferred embodiment, holographic means 26 is of the page-oriented type which comprises $N^4$ individual holograms 44 arranged in an $N^2 \times N^2$, spatially localized array. Holograms 44 are affixed in a transparent substrate such as a glass slide. As is well known, each individual hologram 44 can be formed from a thermoplastic material or a photorefractive material. In the preferred system 10, holograms 44 are permanently recorded. Alternatively, if desired, holograms 44 could be erasable. Those of ordinary skill in the art also appreciate that spatially localized holograms 44 could be of the planar type or could be volume holograms. Further still, it will be understood that the interconnections between TSLM 14 and photodetection surface 30 could be made by an array of lenses and/or mirrors. However, holographic means 26 is the preferred element to provide for $10^{12}$ or more interconnections in network 10.

The TSLM 14 is defined to have $N^2$ pixels. Photodetecting surface 30 and reflecting surface 34 likewise are defined to have $N^2$ pixels. Each pixel of TSLM 14 modulates a portion of the light from laser 12 and transmits the modulated light therethrough to provide a spatial pattern formed of $N^2$ modulated light beams. Holographic means 26 and TSLM 14 are optically aligned so that the modulated light beam from each pixel of TSLM 14 illuminates $N^2$ holograms 44 of the holographic means. Each hologram 44 in turn switches the direction of the modulated light from TSLM 14 to project a modulated interconnecting beam through beamsplitter 26 to a particular pixel on photodetection surface 30. By way of example, when the ith group of $N^2$ holograms 44 are illuminated by light from the ith pixel of TSLM 14, these $N^2$ holograms will direct one interconnecting beam, modulated or encoded by the intensity of the light passed by the ith pixel of TSLM 14, to each of the $N^2$ pixels of photodetection surface 30 (and the reflecting face 34 of RSLM 36). It is thus understood that holographic means 26 divides the $N^2$ modulated light beams from TSLM 14 which form the input spatial pattern and switches their direction to project $N^4$ modulated interconnecting beams through beamsplitter 28. All of the $N^4$ holograms 44 of holographic means 26 have the same transmittivity so that the relative intensities of the projected interconnecting beams will not be changed by the holographic means. Indeed, if holographic means 26 were directly exposed to light from laser 12, without the affects of TSLM 14 and transmissive screen 24, each interconnecting beam projected by the holographic means would have the same intensity and therefore the same interconnection weight or strength.

Figure 3:
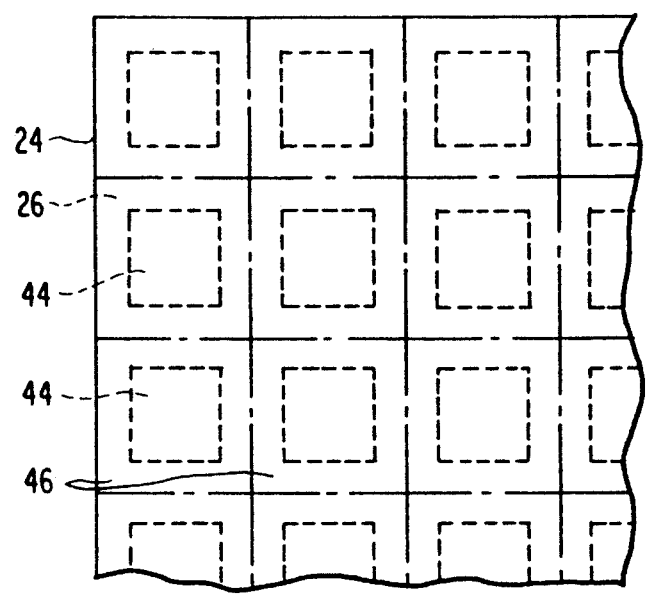
FIG. 3 is a schematic plan view of a preferred interconnector according to the present invention, which interconnector comprises a photosensitive screen in optical alignment with an $N^2 \times N^2$ array of holograms provided in a page-oriented holographic means.

Phototransmissive screen 24 assigns the weight or strength to each interconnection made by interconnector 22. As illustrated in FIG. 3, screen 24 is divided into imaginary partitions or cells 46 delineated by alternating dot-dash lines. There is no physical boundary between the partitions 46. Screen 24 and holographic means 26 are aligned such that there is a one-to-one correspondence between each partition 46 and each hologram 44 and therefore each interconnection beam projected by the holographic means. Accordingly, screen 24 is defined to have $N^4$ such partitions 46 likewise arranged in an $N^2 \times N^2$ array. The intensity of each interconnection beam is controlled by the optical transmittivity of each partition 46 to assign an interconnection strength to each such beam.

Preferred screen 24 comprises a sheet of photochromogenic material such as a photochromic or photodichromic glass. In the preferred embodiments, screen 24 also could comprise a photodichroic material. It is also contemplated that screen 22 may comprise photographic emulsions. Regardless of which type of material is selected to form screen 24, the screen is fabricated so that when one or more of its cells or partitions 46 are exposed to light having a certain parameter, the screen 22 reacts by modifying its absorption spectrum in the exposed partition or partitions. Where photosensitive screen 24 is constructed from a photochromic material, a photochromic glass such as Corning fast fade No. 8111 glass or a Corning experimental glass known as UXC are preferred. The photodichromic glass darkens where it is exposed to light having an intensity which exceeds a characteristic threshold intensity for the glass. Hereinafter, this characteristic intensity will be referred to as the modification threshold intensity, that is the beam intensity necessary to modify the optical transmittivity of the glass. The degree of darkening depends upon the actual intensity of the exposing light and the duration of exposure. If the exposure light intensity fails to exceed the threshold modification intensity, the light can be transmitted through the screen without appreciably affecting the transmittivity of the exposed partitions 46 thereof.

It follows that where interconnector 22 comprises a photochromic screen 24 in preferred system 10, laser 12 is provided to have an carrier beam with an intensity somewhat below the threshold intensity of the screen. The TSLM 14 modulates in any of several know ways without amplifying the intensity of the light. The PCM 42 and the RSLM 36 provide the optical means for carrying out modification of the interconnection strengths by amplifying light transmitted through screen 24 to above the modification threshold and directing the amplified light to expose selected partitions of the screen. It is the province of the PCM 42 to amplify the exposure light to the necessary intensity. The RSLM 36 directs the amplified light to the desired partitions 46 to be modified.

The phase conjugating materials from which PCM 42 is provided are now well known in the art. PCM 42 is a nonlinear optical device which reverses the direction of propagation of probe beams incident on it so as to provide return beams which exactly retrace the path of the probe beams back to their points of origin. As explained in U.S. Pat. No. 4,739,496, a diverging light beam emanating from a point source will, upon reflection from a phase conjugating device, result in a converging beam which propagates back to its origin point in space. This property is referred to in the art as wave front reversal or time-reversal reflection.

To suitably amplify the return beams, PCM 42 could be of the degenerate four wave mixing type wherein two pump beams having the same frequency are directed to set up a standing wave in a transparent material whose index of refraction varies with intensity. When the material is exposed by probe beams also having the same frequency, the material emits time-reversed return beams which are amplified by the pump beams. Numerous other phase conjugating devices are readily available and could be used in system 10. Such devices in include three-wave or other four-wave mixing photon scatter devices, Kerr-like phase conjugation devices, stimulated scattering or back scattering devices, nonlinear photon echo devices, surface phase conjugation devices, and various semiconductor or photo-refractive devices.

Computer 38 determines how the interconnection strengths set by photosensitive screen 24 are to be modified and controls the reflectivity of RSLM 36 accordingly. Computer 38 could be an electronic computer but it is also contemplated that computer 38 can be constructed from optical components. Computer 38 receives detection signals having analog values from detector 32 and signals representative of a desired pattern from its memory 40. Mathematically, the detection signals received from detector 30 can be thought of as a $N^2 \times 1$ vector which will be referred to as Y'. The desired pattern signals would be considered as representing a $N^2 \times 1$ vector T. Computer 38 generates error signals, which will be considered as another $N^2 \times 1$ vector E, as a function of the vectors Y' and T. The particular function selected for generation of the error signals depends upon the application of preferred system 10. Any of several well known algorithms may be selected.

To generate the error signal vector E, computer 38 compares the detection signals Y' and the desired pattern signals T and calculates the error signals in proportion to the differences between the detection and the desired pattern signals. In detail, detector 32 generates a detection signal in response to the intensity of light at each pixel on its photodetecting surface 30. Detector 32 applies $N^2$ of these detection signals in parallel to computer 38 as vector Y'. Computer 38 compares each component signal $y_i'$ of Y' with a corresponding element $t_i$ of T to generate a series of error signals which form the error vector E which is applied to RSLM 36. Each pixel of photodetecting surface 28 has a corresponding pixel on RSLM 36. When the error vector E is applied to RSLM 36, the RSLM responds by altering the reflectivity of the defined pixels of its reflective surface 34. The reflectivity of the ith pixel of surface 34 is changed in proportion to the difference between the element $y_i'$ of vector Y' and the element $t_i$ of vector T. If computer 38 determines that $y_i$ equals $t_i$, the error signal representative of $e_i$, when applied to RSLM 36, will cause the ith pixel of RSLM 36 to be made substantially less reflective and preferably substantially nonreflective. On the other hand, a large difference between a signal $y_j$ and $t_j$ translates to a small reduction or no reduction in the reflectivity of the jth pixel of RSLM 36. Thus, RSLM 36 only weakly partially reflects to PCM 42 each distribution of $N^2$ modulated interconnecting beams which provide a detection signal nearly equal to the desired pattern signal when detected at detector 32. The RSLM 36 fully reflects each group of modulated interconnecting beams which cause generation of detection signals that are substantially different from their corresponding desired pattern signals.

The pattern of partially and strongly reflected beams from RSLM 36 are the probe beams for PCM 42. The PCM 42 generates return beams having amplified intensities proportional to the probe beams from RSLM 36. The RSLM 36 in turn reflects the amplified return beams from PCM 42 in the same manner that it directs the modulated interconnecting beams as probe beams onto PCM 42 so that the relative low intensity return beams which correspond to the weakly reflected probe beams are themselves only partially reflected and the relatively high intensity return beams which correspond to the substantially fully reflected probe beams likewise are fully reflected by the RSLM. All of the return beams are directed through holographic means 26 to illuminate photosensitive screen 24. Due to the amplification of the controlled reflectivity of the pixels of reflecting surface 32, the fully or nearly fully reflected return beams have intensities exceeding the modification threshold for screen 24. The highly reflected return beams thus darken their corresponding screen partitions 46. The partitions 46 darkened are those that first pass and encode the interconnecting beams which first become the highly reflected probe beams and thereafter, the high intensity return beams. The interconnection strengths set by the darkened partitions 44 are thus reduced to correspondingly reduce the error signal components $e_i$ with which they are associated. The weaker the reflected return beam directed onto screen 24 by RSLM 36, the less effect the return beam will have on the transmittivity of its associated screen partition 46. The weakest reflected return beams will have intensities less than the screen threshold modification intensity and thus leave their associated partitions unchanged.

To generate the $N^2$ signals defining vector Y', detector 32 performs a detection function and a nonlinear operation. The detection function is elementary and will be considered first. Each pixel of photodetecting surface 30 is exposed to $N^2$ interconnecting beams projected by holographic means 26. Detector 32 sums the intensities of the $N^2$ beams incident on each of its $N^2$ pixels to obtain a summed intensity value at each pixel. With reference to the mathematical representations introduced supra., the $N^2$ summed intensity values provide the elements $y_i$ of a $1 \times N^2$ column vector Y.

Figure 4:
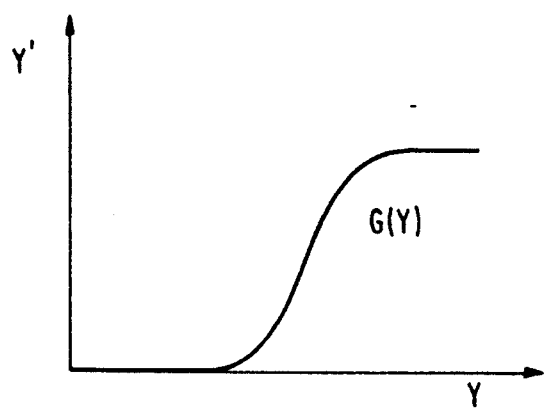
FIG. 4 illustrates a sigmoidal, monotonic input-output response characteristic utilized in the neural network of FIG. 2.

Detector means 32 then performs a nonlinear transformation of each of the $N^2$ detected intensity values $y_i$ to obtain a new value $y_i'$. FIG. 4 is a graphical representation of a function G(Y) which describes the transformation carried out by detector 32 for each summed intensity value $y_i$. The function G(Y) is a continuous, monotone increasing, nonlinear function which maps the vector Y in $N^2$ space to the new vector Y' in $N^2$ space to provide a sigmoidal threshold response. Detector 32 can be controlled to set the particular slope or steepness of its sigmoidal response curve G(Y) depending upon different applications of system 10. Preferably detector 32 performs the nonlinear transformation of each of the summed intensity values in parallel to apply the vector Y' in parallel to computer 38.

In describing the operation of preferred system 10, reference will be made to a series of mathematical operations that represent a series of processing steps which the system automatically carries out. According to a mathematical description, system 10 is understood as performing five distinct steps. The first step is a matrix vector multiplication given by $$AX = Y$$

where X is the input vector that represents an input pattern which, for example, system 10 may be made to learn for subsequent identification of such pattern. As described above input vector X may be thought of as a $N^2 \times 1$ column vector in the form $$X = \begin{bmatrix} x_1 \\ x_2 \\ \cdot \\ \cdot \\ \cdot \\ x_i \\ \cdot \\ \cdot \\ \cdot \\ x_{N^2} \end{bmatrix}$$

Input vector X is programmed into system 10 by means of TSLM 14. The TSLM 14 in turn imparts to the light from laser 12, an input spatial pattern representative of the input vector X. As TSLM 14 is defined to have $N^2$ pixels, each pixel transmits light representing one element $x_i$ of X.

Holographic means 26 and photosensitive screen 24 insert the matrix A into system 10. Corresponding to the $N^2 \times 1$ vector X, the matrix A is an $N^2 \times N^2$ matrix having $N^4$ elements. The magnitude of each element $a_{ij}$ of A is encoded by photosensitive screen 24. The magnitude of the elements $a_{ij}$, represent the strength of each interconnection made between TSLM 14 and detector 32. Light from each pixel of TSLM 14 is switched into $N^2$ separate beams by holographic means 26. Holographic means 26 thus projects $N^2$ separate beams corresponding to each pixel of TSLM 14 onto an associated pixel on detecting surface 30 and an associated pixel on reflecting surface 34. When photodetecting surface 30 sums the intensities of the $N^2$ interconnecting beams incident on each pixel thereof, the matrix multiplication $$AX = Y$$

is completed.

the second step, written as $$NL(Y) = Y,$$

is carried out by detector 32. Detector 32 nonlinearly transforms the intensity value registered at each detection pixel according to the sigmoid $g(y_i) = y_i'$ graphically illustrated in FIG. 4. The resulting vector Y' is applied to computer 38 for comparison and calculation of the error signal vector E.

Computer 38 determines the vector E according to a function of Y' and T. This step is written as $$E = F(X, Y, T).$$

The particular function, F, selected for generation of vector E can be any of several well known learning algorithms and could simply be $c(Y'-T)^{\frac{1}{2}}$ where c is the amplification factor of PCM 42. The vector E is also written as a function of X because each particular desired pattern T is associated with a particular input pattern X.

Computer 38 applies vector E to RSLM 36 to set the reflectivity of each pixel of RSLM 36 accordingly. The weighted interconnecting beams modulated by TSLM 14 are reflected by RSLM 36 as probe beams onto PCM 42. The intensities of the $N^4$ probe beams are controlled by the reflectivity of each pixel defined on reflective face 34. Thereafter, PCM 42 time reverse reflects and amplifies the probe beams to provide amplified return beams to RSLM 36. Pixels of RSLM 36 controlled to be poorly reflective and pixels adjusted to be highly reflective further adjust the intensities of the return beams and then direct them to illuminate phototransmissive screen 24. This double reflection of the optical signals representing vector Y as probe beams from RSLM 36 onto PCM 42 and back as amplified return beams from the PCM completes an operation described by the vector multiplication $$Z = E^2 Y.$$

The light beams indicative of the vector Z are amplified by the characteristic gain of PCM 42 to have sufficient intensity to alter the transmittivity of selected partitions 46 of photosensitive screen 24 and thereby change the interconnection strengths according to the relation $$\Delta a_{ij} = c e^2 x_i a_{ij}$$

where c is the amplification of the PCM 42.

In the initial state of operation of system 10, there would be no error signal and thus no conjugate beams from PCM 42. Then, a new spatial pattern is transmitted to TSLM 14 to begin a new cycle of learning.

Figure 5:
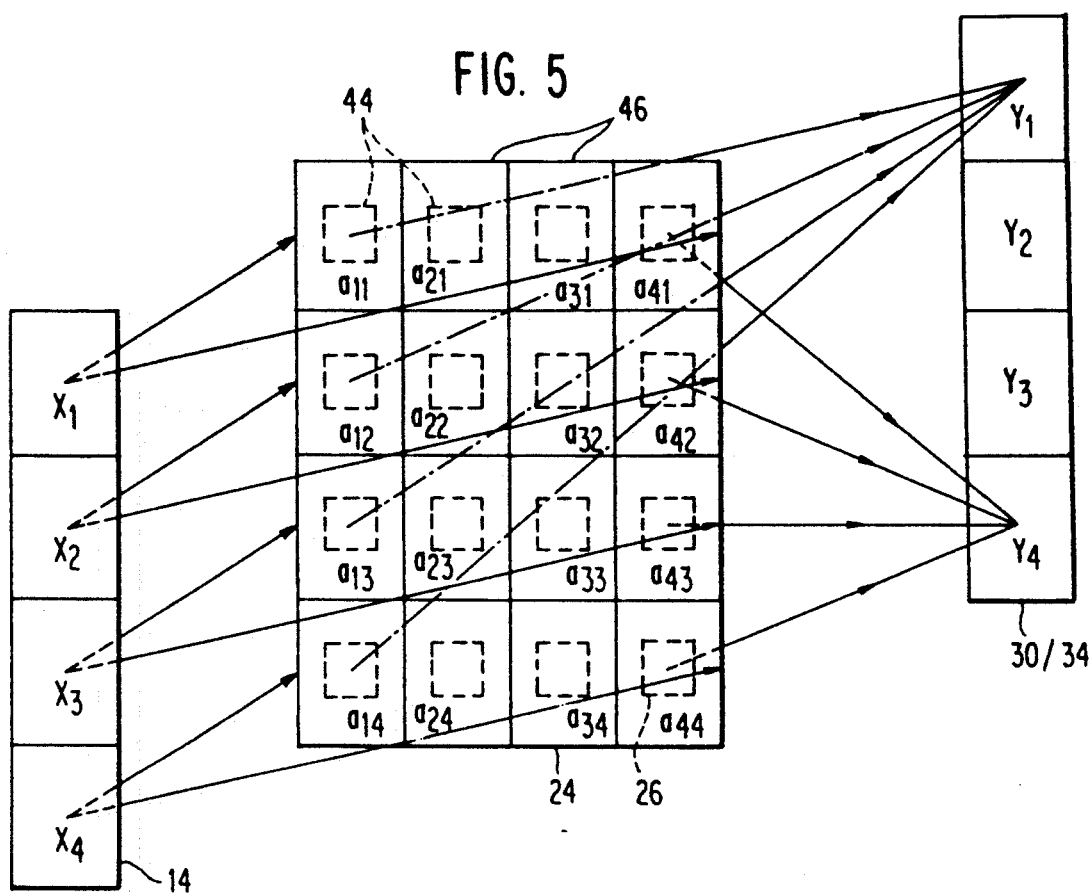
FIG. 5 is a ray diagram useful in illustrating one possible optical interconnection of the input and detection elements in the network of FIG. 2.
Figure 6:
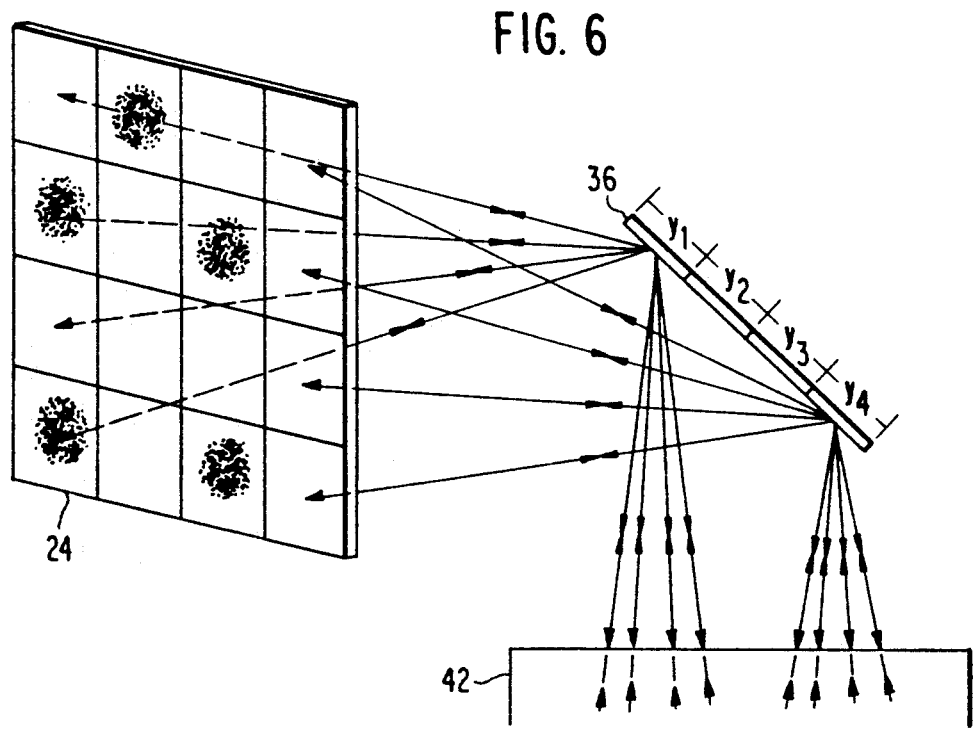
FIG. 6 is a ray diagram useful in illustrating modification of the transmittivity of the screen in the network of FIG. 2.

In connection with the operation of the preferred neural network according to the invention, FIGS. 5 and 6 are partial ray diagrams useful in illustrating the optical paths between the elements in the network. The example in FIGS. 5 and 6 of course is greatly simplified where, for purposes illustration, N is considered to equal 2. It is understood by those of ordinary skill in the art that FIGS. 5 and 6 are only one example of the optical paths between the elements shown and that various alternative paths are apparent. As holograms 44 do not affect the modification of the transmittivity of screen 24, the holograms are omitted in FIG. 6.

With N considered to equal 2 and with reference to both FIG. 2 and FIG. 5, it is understood that light from each pixel $x_i$ of TSLM 14 illuminates an entire row of partitions 46 of phototransmissive screen 24. The transmissive condition of each partition 46 determines the intensity of the light passed therethrough to its underlying hologram 44. As seen from FIG. 6, the holograms associated with each column of partitions 46 interconnect each pixel $x_i$ of TSLM 14 with its corresponding pixel $y_i$ on photodetector 32 and RSLM 36. The intensity at each pixel $y_i$ of photodetector 32 and RSLM 36 is thus given by $$y_i = a_{i1} x_1 + a_{i2} x_2 + a_{i3} x_3 + a_{i4} x_4.$$

As discussed in the foregoing, photodetector 32 automatically performs the summation to complete the matrix multiplication $AX = Y$ and thereafter carries out the nonlinear transformation according to G(Y) to obtain Y'.

When the error vector E is applied to RSLM 36, the reflectivity of each pixel $y_i$ therefore is adjusted accordingly to direct each of the four modulated and weighted interconnecting beams as probe beams onto PCM 42. The PCM 42 in turn generates amplified return beams which retrace the path of the probe beams so that when reflected by RSLM 36, the return beams are directed back to expose the same partition 46 which passed the interconnecting beam providing their respective probe beam. When exposed to the return beams, the partitions 46 darken to reduce the intensity of the return beams and cause the output vector Y' to approach the desired pattern vector T.

Figure 7:
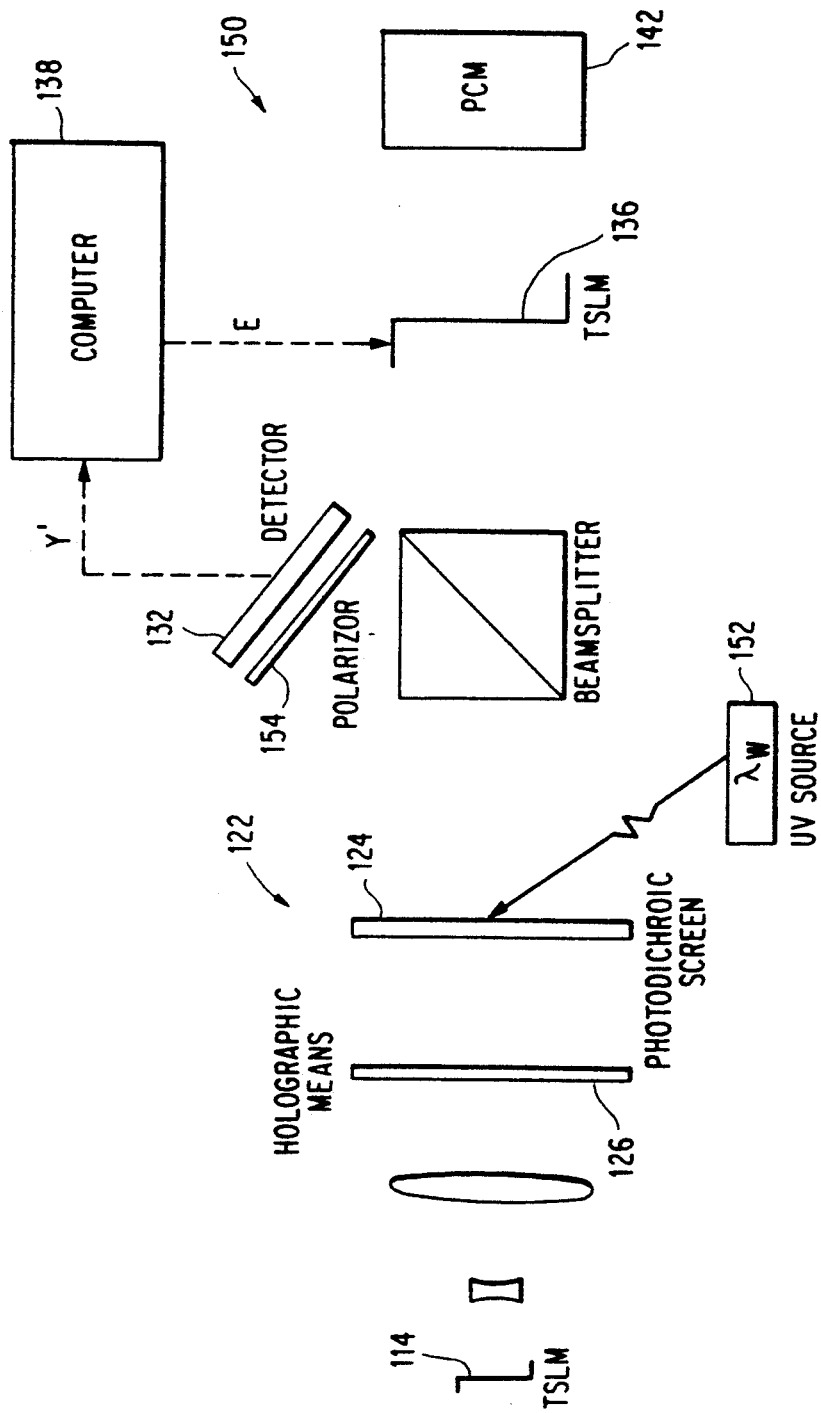
FIG. 7 is a block diagram showing an alternative embodiment of an interconnector in accordance with the present invention.

Previously, it has been stated that the photosensitive screen in the interconnector of the present invention could comprise a photodichroic material. FIG. 7 shows an alternative embodiment of an interconnector 122 together with means 150 for modifying the weights of the interconnections made by interconnector 122. Interconnector 122 comprises a photodichroic screen 124, and a holographic means 126. Except that screen 124 comprises a photodichroic material, screen 124 can be constructed in essentially the same way as interconnector 22 of FIG. 2. It is contemplated that screen 124 comprises a sheet of sodium fluoride crystals with lithium doping, or a sheet comprising potassium fluoride crystals. Preferably a doped sodium fluoride sheet comprises about 0.175 lithium by weight and measures about 2.5 cm by 2.5 cm on a side. Such a preferred sheet has a thickness of approximately 0.2 mm.

It is contemplated to modify screen 124 by either direct or suppressive extinction writing. These techniques for writing and reading photodichroic materials generally, and lithium doped $N_a F$ materials in particular, have been discussed at length in several articles, notably Casasent and Caimi, "Combined Suppressive And Extinction Writing Using M and $M_A$ Centers and Li-doped NaF", *Appl. Phys. Lett.* (Vol. 29, No. 10, Nov. 15, 1976); Schneider, "Extinction Technique For Optical Storage Using Anisotropic Color Centers In Alkali Halides", *Applied Physics Letters*, (Vol. 25, No. 1, Jul. 1, 1974); Casasent and Caimi, "Photodichroic Crystals for Coherent Optical Data Processing", *Optics and Laser Technology*, (April 1977); and Casasent and Caimi, "Suppressive Writing in Lithium-Doped NaF", (Phys. Stat. Sol. (a)34.461, 1976) which are incorporated by reference herein.

As discussed in detail in the above-listed articles, extinction writing uses the anisotropy and dispersion of "M" or color centers in the screen 124. An "M" center is defined as two nearest-neighbor "F" centers along a <011> direction. An "F" center is defined as an electron trapped at a negative-ion vacancy. Depending upon the alignment of their vacancy axes, the M centers are described as existing in a "O" state, i.e. state-0, or a re-oriented state referred to as state-1. M centers have an absorption spectrum substantially comprising two bands, an M band at $\lambda_R \approx 506$ nm and an $M_F$ band at $\lambda_w$ in the range of 300 to 400 nm.

In direct writing, the entire screen 124 is exposed to $\lambda_{WO}$ light, having a polarization $P_O$. Exposure to the $\lambda_{WO}$ light initially aligns most of the M centers to state-O, that is the $\lambda_{WO}$ light bleaches the screen. Thereafter when particular partitions of the screen 124 are exposed to $\lambda_{W1}$ light having a different polarization $P_1$, the M centers of the exposes portions will re-orient to state-1 to carry out writing. The screen then can be nondestructively read by exposing it to read light, $\lambda_R$ in the M band.

For interconnector 122, suppressive extinction writing is preferred because the same wavelength $\lambda_R$ can be used for both writing and non-destructive reading of the screen 124. Interconnector is thus depicted with a source 152 of ultraviolet (UV), $\lambda_W$ light. According to the theory of suppressive writing, the entire screen 124 is continuously exposed to UV light in the $M_F$ band which thus tends to orient the M centers to state-1. However, in partitions of screen 124 which are simultaneously illuminated by $\lambda_R$ light in the M band, the re-orienting affects of the UV, $\lambda_W$ light are suppressed. Non-destructive reading is performed only with $\lambda_R$ light. Accordingly, modification of the screen 124 is controlled by the $\lambda_R$ light.

Screen 124 is modified by suppressive extinction writing due to the presence of a polarizor 154 located in front of photodetector 132. According to this technique, spatially modulated $\lambda_R$ light from an input TSLM 114 is linearly polarized, for example vertically polarized. Polarizer 154 then would be a horizontal polarizor so that interconnector 122 is in the optical path between crossed polarizors. If the concentrations of M centers in state-0 and state-1 are equal, the vertical polarization of $\lambda_R$ is unchanged so that all of the light is absorbed by polarizer 154. If $M_0 \neq M_1$, then $\lambda_R$ is transmitted to photodetector 132 at an intensity given by $$I = I_O[\tfrac{1}{2}(a_0 - a_1)^2 + a_0 a_1 \sin^2(\pi d(n_v - n_h)\lambda_R]$$

where $I_O$ is the incident light intensity, $a_0$ and $a_1$ are amplitudes of the incident light polarized along [011] and [0$\bar{1}$1] respectively, d is the screen thickness and $n_v$ and $n_h$ are the refractive indices for vertically and horizontally polarized light respectively. Computer 138 receives magnitude intensity signals for each pixel defined for photodetector 132 following a nonlinear thresholding operation by the photodetector. Based upon a comparison of the threshold output signals from photodetector 132 with the desired input, computer 138 controls TSLM 136 and PCM 142 to generate return beams which change the respective state-1 and state-0 M center concentrations and thereby modify the transmittivity of the screen 124 to provide an output pattern similar to the input.

Figure 8:
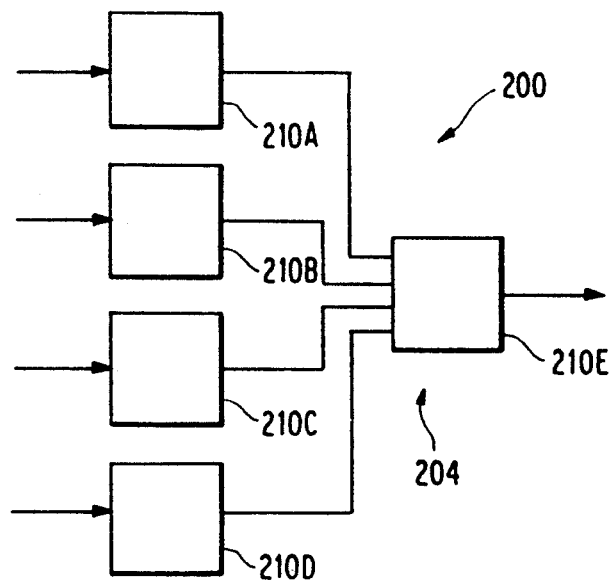
FIG. 8 is a block diagram of a composite neural network incorporating several neural networks of the type shown in FIG. 2.

For applications such as recognizing very complex objects or patterns, a composite network comprising several constituent systems according to the present invention can be provided. An example of such a composite network 200 is shown in block-diagram form in FIG. 8. Exemplary composite network 200 has a first stage 202 of four neural networks 210A, 210B, 210C and 210D, and a second stage 204 with one system 210E which receives output from the other four. Each system 210A through 210E can be arranged essentially like optical network 10 discussed in connection with FIG. 2. In operation, each of first stage systems 210A, 210B, 210C, and 210D are made to learn to recognize a particular object or pattern which would be a portion of a larger pattern to be recognized by composite network 200. For instance, first stage network 210A might be made to recognize the wing of a plane, system 210B, the forward portion of the fuselage, system 210C, the tail portion, and system 210D, markings or decals on the body of the plane. When the outputs from the first stage systems 210A through 210D are provided to second stage system 210E, system 210E would recognize the composite object as a particular type of aircraft.

It is to be understood that there can be various changes and modifications to the preferred embodiments of the system of the present invention disclosed herein, which changes and/or modifications may be made by one ordinary skill in the art, but such would still result in a system well within the scope of the invention as set forth in the claims.

What is claimed is:

1. A variable weight optical interconnector for effecting optical interconnection between two elements, said interconnector comprising:

interconnecting means adapted to direct light beams encoded with information by a first element which provides information to a second element along interconnection paths without changing a parameter of each beam relative to the other interconnecting beams, which parameter is used to indicate provided information, and interconnection weighting means, located remote from said interconnection means in said interconnection paths so as to be illuminated by said light beams before said parameter of any of said beams has changed, for controlling said parameter of each interconnecting light beam to assign an interconnection weight to each said interconnection path.

2. A variable weight optical interconnector comprising:

projecting means for projecting a distribution of interconnecting light beams along paths without changing a parameter of each beam relative to the other interconnecting beams projected thereby, and interconnection weighting means, provided remote from said projection means in said paths so as to be illuminated by said interconnecting beams before said parameter of any of said beams has changed, for controlling said parameter of each interconnecting light beam to assign an interconnection weight to each such beam, said interconnection weighting means including a photosensitive screen which controls the intensity of each interconnecting beam.

3. An interconnector as claimed in claim 2, wherein said photosensitive screen comprises a photochromic material.

4. An interconnector as claimed in claim 3, wherein said photochromic material is a photochromic glass.

5. An interconnector as claimed in claim 2, wherein said photosensitive screen comprises a photodichroic material.

6. An interconnector as claimed in claim 5, wherein said photodichroic material comprises sodium fluoride doped with about 0.175 percent lithium by weight and said screen has a thickness of about 0.2 mm.

7. An interconnector as claimed in claim 5, wherein said photodichroic material comprises potassium fluoride.

8. An interconnector as claimed in claim 2, wherein said projecting means comprises a page-oriented holographic means including an array of spatially-localized holograms provided in one-to-one correspondence with an array of independently, variably transmissive cells defined on said screen.

9. An interconnector as claimed in claim 8, further comprising means for exposing said cells to light to modify the interconnection weights of selected interconnecting beams.

10. An interconnector as claimed in claim 9, wherein said modifying means comprises a phase conjugate mirror and a spatial light modulator providing an optical path between said screen and said phase conjugate mirror.

11. An interconnector as claimed in claim 9, wherein said modifying means further comprises a source of UV light disposed to fully expose said screen.

12. An interconnector as claimed in claim 1, wherein said interconnection weighting means comprises a photosensitive screen.

13. An interconnector as claimed in claim 12, wherein said photosensitive screen comprises a photochromic material.

14. An interconnector as claimed in claim 12, wherein said photosensitive screen comprises a photodichroic material.

15. An interconnector as claimed in claim 14, wherein said photodichroic material comprises sodium fluoride doped with about 0.175 lithium by weight and said screen has a thickness of about 0.2 mm.

16. An interconnector as claimed in claim 14, wherein said photodichroic material comprises potassium fluoride.

17. An interconnector as claimed in claim 1, wherein said projecting means comprises a page-oriented holographic means including an array of spatially-localized holograms provided in one-to-one correspondence with an array of independently, variably transmissive cells defined on said interconnection weighting means.

18. An interconnector as claimed in claim 17, further comprising means for exposing said cells to light to modify selected interconnection weights.

19. An interconnector as claimed in claim 18, wherein said modifying means comprises a phase conjugate mirror and a spatial light modulator providing an optical path between said interconnection weighting means and said phase conjugate mirror.

20. An interconnector as claimed in claim 18, wherein said modifying means further comprises a source of UV light disposed to fully expose said screen.

* * * * *